(12) United States Patent
Micko (10) Patent No.: US 7,755,052 B2
(45) Date of Patent: Jul. 13, 2010

(54) PIR MOTION SENSOR

(75) Inventor: Eric Scott Micko, Rescue, CA (US)

(73) Assignee: Suren Systems, Ltd., Hong Kong (HK)

( * ) Notice: Subject to any disclaimer, the term of this patent is extended or adjusted under 35 U.S.C. 154(b) by 747 days.

(21) Appl. No.: 11/134,780

(22) Filed: May 20, 2005

(65) Prior Publication Data

US 2005/0236572 A1    Oct. 27, 2005

Related U.S. Application Data

(63) Continuation-in-part of application No. 11/097,904, filed on Apr. 1, 2005, now Pat. No. 7,183,912, which is a continuation-in-part of application No. 10/600,314, filed on Jun. 20, 2003, now Pat. No. 7,399,970, which is a continuation-in-part of application No. 10/388,862, filed on Mar. 14, 2003, now Pat. No. 7,399,969.

(60) Provisional application No. 60/560,228, filed on Apr. 6, 2004.

(51) Int. Cl.
*G01J 5/20* (2006.01)
(52) U.S. Cl. .................................................. 250/342
(58) Field of Classification Search .................. 250/342
See application file for complete search history.

(56) References Cited

U.S. PATENT DOCUMENTS 3,829,693 A    8/1974  Schwartz ................... 250/338
4,618,854 A *  10/1986 Miyake et al. .............. 340/567
4,864,136 A    9/1989  Behlke ..................... 250/338.3
4,880,980 A *  11/1989 Muller et al. ............... 250/353
4,912,748 A    3/1990  Horii et al. .................. 250/221
4,990,783 A *  2/1991  Muller et al. ............... 250/353
5,045,702 A *  9/1991  Mulleer ...................... 250/342
5,126,718 A    6/1992  Doctor ....................... 340/567
5,313,060 A    5/1994  Gast et al. ................... 250/221
5,432,350 A    7/1995  Kuritani et al. ........... 250/338.3
5,461,231 A   10/1995  Sugimoto et al. ........... 250/342
5,923,250 A    7/1999  Pildner ....................... 340/567
6,163,025 A   12/2000  Pantus ...................... 250/338.3
6,215,399 B1   4/2001  Shpater ..................... 340/ 567
6,239,433 B1   5/2001  Porter ....................... 250/338.3
6,559,448 B1 * 5/2003  Muller et al. ............... 250/342

FOREIGN PATENT DOCUMENTS

| EP | 0953952       | 11/1999 |
| EP | 1089245 A1 *  | 4/2001  |
| GB | 2201770       | 9/1998  |

\* cited by examiner

*Primary Examiner*—David P Porta
*Assistant Examiner*—Shun Lee
(74) *Attorney, Agent, or Firm*—John L. Rogitz (57) ABSTRACT

A passive infrared sensor has two detection members established by respective detectors and optical elements, with alternating spatial volumes being monitored by each detection member. No dead space need exist between volumes. The detection members are configured such that a moving object causes the members to output different frequencies, whereas a non-moving stimulus produces the same frequency from both detection members.

16 Claims, 8 Drawing Sheets

PIR MOTION SENSOR

PRIORITY CLAIM

This is a continuation-in-part of and claims priority from U.S. patent application Ser. No. 11/097,904 filed Apr. 1, 2005 now U.S. Pat. No. 7,183,912, which is a CIP of Ser. No. 10/600,314, filed Jun. 20, 2003, now U.S. Pat. No. 7,399,970, U.S. patent publication 2004/0169145, which is a CIP of Ser. No. 10/388,862, filed Mar. 14, 2003, now U.S. Pat. No. 7,399, 969 U.S. patent publication 2004/40140430. Priority is also claimed from U.S. provisional application Ser. No. 60/560, 228, filed Apr. 6, 2004. The above documents are incorporated herein by reference.

I. FIELD OF THE INVENTION

The present invention relates generally to motion sensors.

II. BACKGROUND OF THE INVENTION

The parent applications disclose simple PIR motion sensors with low false alarm rates and minimal processing requirements that are capable of discriminating smaller moving targets, e.g., animals, from larger targets such as humans, so that an alarm will be activated only in the presence of unauthorized humans, not pets.

In U.S. Pat. No. 5,923,250, incorporated herein by reference, a motion sensing system is disclosed that uses dead zones between monitored volumes of a space for reducing false alarms caused by small animals. A moving object is indicated not by simultaneous differences in signals between detectors (such as different frequencies), but simply by noting that the detectors alternatingly produce a temporal sequence of signals as the object moves through the volumes. The present invention recognizes that the principles of the parent applications can be applied with inventive modification to the system disclosed in the '250 patent to obviate the need for dead zones while maintaining functionality.

SUMMARY OF THE INVENTION

A PIR motion sensor includes at least first and second infrared detection members, with each detection member including at least one optical element and at least one detector with at least positive and negative detector elements. The optical elements cooperate to establish four or more monitored spatial volumes substantially without any unmonitored dead space between any two adjacent volumes. The first detection member monitors first volumes and the second detection member monitors second volumes, and the first and second volumes spatially alternate in sequence. A moving object causes the detector of the first detection member to output a signal having a frequency that is different from an output of the detector of the second detection member, while a non-moving stimulus causes both detectors to output the same frequency.

To produce this frequency discrimination of moving objects from non-moving stimuli, detector elements of the first detection member can have different sizes than detector elements of the second detection member. In addition or alternatively, the spacing between adjacent detector elements of the first detection member can be different from the spacing between adjacent detector elements of the second detection member. Or, the focal length of the optical element of the first detection member may be different from the focal length of the optical element of the second detection member. As yet another way to produce frequency-based discrimination of moving objects from non-moving stimuli, the number of lens elements of the optical element of the first detection member can be different from the number of lens elements of the optical element of the second detection member.

In another aspect, a motion sensor has at least first and second detection members monitoring alternating volumes of space with substantially no unmonitored vertical space between any two monitored volumes. Each detection member includes at least one optical element and at least one detector with at least positive and negative detector elements, and a moving object causes the detection members to output different frequencies from each other whereas a non-moving stimulus causes both detection members to output the same frequency.

In yet another aspect, a motion sensor has at least first and second detection members monitoring alternating volumes of space. Each detection member includes at least one optical element and at least one detector with at least positive and negative detector elements, and a moving object causes the detection members to output different frequencies from each other, whereas a non-moving stimulus causes both detection members to output the same frequency.

In another aspect, a motion sensor has at least first and second detection members monitoring alternating volumes of space with substantially no unmonitored vertical space between any two monitored volumes. Each detection member includes at least one optical element and at least one PIR detector with at least positive and negative detector elements The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
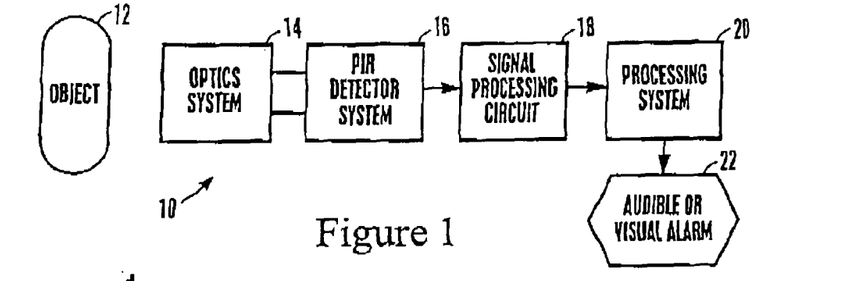
FIG. 1 is a block diagram of the present system architecture.

Referring initially to FIG. 1, a system is shown, generally designated 10, for detecting a moving object 12, such as a human. The system 10 includes an optics system 14 that can include appropriate mirrors, lenses, and other components known in the art for focussing images of the object 12 onto a passive infrared (PIR) detector system 16. The disclosure below discusses various embodiments of the PIR detector system 16. In response to the moving object 12, the PIR detector system 16 generates a signal that can be filtered, amplified, and digitized by a signal processing circuit 18, with a processing system 20 (such as, e.g., a computer or application specific integrated circuit) receiving the signal and determining whether to activate an audible or visual alarm 22 or other output device such as an activation system for a door, etc. in accordance with the flow charts herein.

Figure 2:
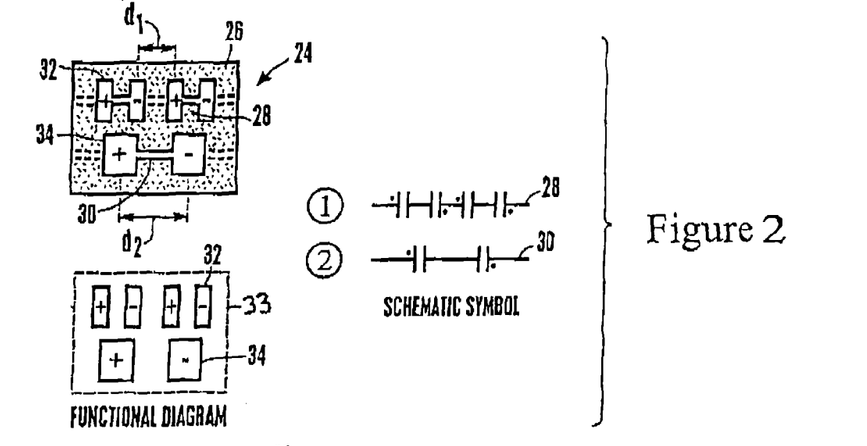
FIG. 2 is a schematic diagram of a first sensor embodiment with differently-sized detectors on the same substrate in one housing, showing a plan view of the detectors along with symbol and functional diagrams of the sensor.

Having described the overall system architecture, reference is now made to FIG. 2, which shows a first exemplary embodiment of the PIR sensor of the present invention. As shown, IR detection means for a PIR sensor 24 can include a single, preferably ceramic substrate 26 on which are formed first and second PIR detectors 28, 30. In the embodiment shown in FIG. 2, the first detector 28 has four elements 32 (two pair of plus and minus polarity elements electrically connected together) and the second detector 30 has two elements 34 (one pair of plus and minus polarity elements), with each pair of elements 32, 34 being joined by an electrical connection, roughly forming an "H". It is to be understood that the detectors 28, 30 include, on the reverse side of the substrate 26 from that shown, complementary components (e.g. "plates" as explained below) which, together with those shown, form the elements 32, 34. Connections among these reverse-side plates are depicted by dashed lines.

The detectors 28, 30 can be pyroelectric detectors that measure changes in far infrared radiation. Such detectors operate by the "piezoelectric effect", which causes electrical charge migration in the presence of mechanical strain. Pyroelectric detectors take the form of a capacitor—two electrically conductive plates separated by a dielectric.

The dielectric is often a piezoelectric ceramic, and is referred to herein as a "substrate". When far infrared radiation causes a temperature change (and thus some mechanical strain) in the ceramic, electrical charge migrates from one plate to the other. If no external circuit is connected to the detector, then a voltage appears as the "capacitor" charges. If an external circuit is connected between the plates, then a current flows.

In accordance with present principles, the center-to-center spacing "d1" between adjacent elements 32 of the first detector 28 is less than the center-to-center spacing "d2" between adjacent elements 34 of the second detector 30. This difference can be achieved as shown in FIG. 2 by making the elements 34 of the second detector 30 larger than the elements 32 of the first detector 28. It can also be achieved by spacing the second detector elements 34 further apart than the first detector elements 32, and/or by providing fewer second detector elements 34 than first detector elements 32.

FIG. 2 also shows a functional diagram of the detectors 28, 30 with elements 32, 34 in accordance with pyroelectric detector principles summarized above, indicating the relative sizes, shapes, and polarities of the subvolumes monitored by the sensor (i.e., a projection of the sizes, shapes, and polarities of the elements) and illustrating that both detectors 28, 30 are mounted in a single housing 33. Also, FIG. 2 shows a schematic symbol diagram representing the elements 32, 34 of the detectors 28, 30 as capacitors with the dots indicating polarity.

Figure 3:
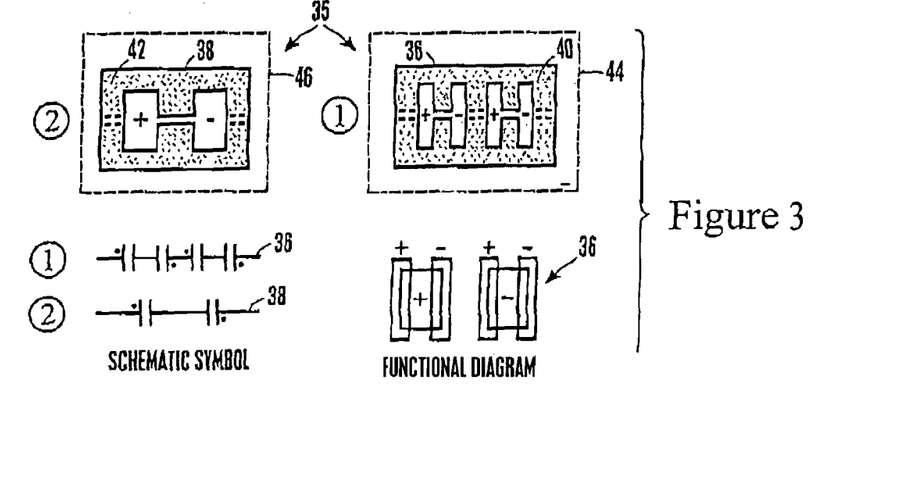
FIG. 3 is a schematic diagram of a second sensor embodiment with two detectors in separate housings, showing a plan view of the detectors along with symbol and functional diagrams of the sensor.

FIG. 3 shows IR detection means for a PIR sensor 35 that has first and second detectors 36, 38 that are in all essential respects identical in configuration to the detectors 28, 30 shown in FIG. 2, except that each detector 36, 38 is mounted on its own respective substrate 40, 42. The substrates 40, 42 can be contained in respective housings 44, 46. According to the embodiment shown in FIG. 3, the optics system 14 (FIG. 1) is arranged such that two preferably dissimilar space sub-volumes are respectively monitored by the detectors 36, 38 and such that the two sub-volumes are optically superposed with each other behind similar optical components. Essentially, combinations of optical components of compound optics are selected such that both detectors' monitored sub-volumes occupy at least portions of the same space.

In contrast to the embodiment shown in FIG. 2, the sensor of FIG. 3 produces two signal frequencies regardless of image size, due to complete functional overlapping of unequal-size elements. It thus has less dependence on object size to generate a detection than does the sensor shown in FIG. 2, which requires that the object be sufficiently large to appear in both monitored sub-volumes.

FIG. 3 also includes a functional diagram illustrating the aspect ratios and juxtaposition of the longitudinal cross-sections of the two sets of monitored sub-volumes. If desired, the two sets of detectors could be wired together to provide a combined signal, which would reduce the number of amplifiers needed in the sensor, at the cost of additional signal processing to separate the two frequencies.

Figure 3A:
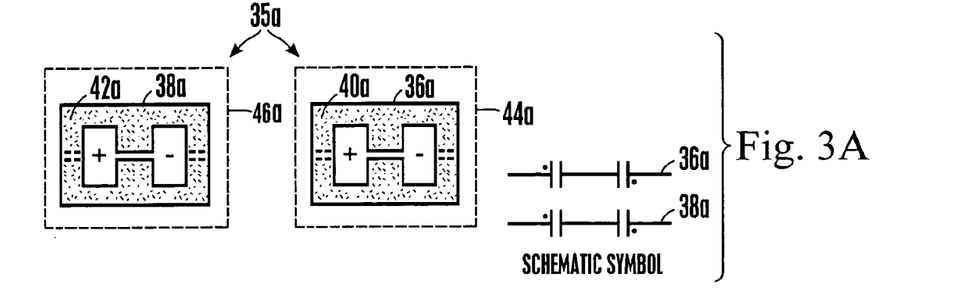
FIG. 3a is a schematic diagram of an alternate embodiment of the second sensor embodiment shown in FIG. 3 that achieves the same functional diagram but that has equally-sized detectors with optics of different focal lengths, showing a plan view of the detectors along with symbol diagrams of the sensor.

FIG. 3a shows an additional detector arrangement that achieves the same functional diagram shown in FIG. 3. A PIR sensor 35a has first and second detectors 36a, 38a that are in all essential respects identical in size and configuration to each other, with each detector 36a, 38a being mounted on its own respective substrate 40a, 42a. The substrates 40a, 42a can be contained in respective housings 44a, 46a. Each detector 36a, 38a has two and only two elements (minus and plus) as shown, and all four elements shown in FIG. 3a are of equal size, with the spacing between the elements of the first detector 36a being the same as the spacing between the elements of the second detector 38a.

According to the embodiment shown in FIG. 3a, the detectors 36a, 38a are provided with respective optics within the optics system 14 that have different focal lengths. In the case where, e.g., the focal length ratio is 2:1, the optics are compound, and the optics associated with the detector 36a can have twice the number of optical elements as the optics associated with the detector 38a. The optics of the detectors 36a, 38a are arranged such that both detectors' monitored sub-volumes occupy at least portions of the same space.

In contrast to the embodiment shown in FIG. 2, the sensor of FIG. 3 produces two signal frequencies regardless of image size, due to complete functional overlapping of unequal-size elements. It thus has less dependence on object size to generate a detection than does the sensor shown in FIG. 2, which requires that the object be sufficiently large to appear in both monitored sub-volumes.

Figure 4A:
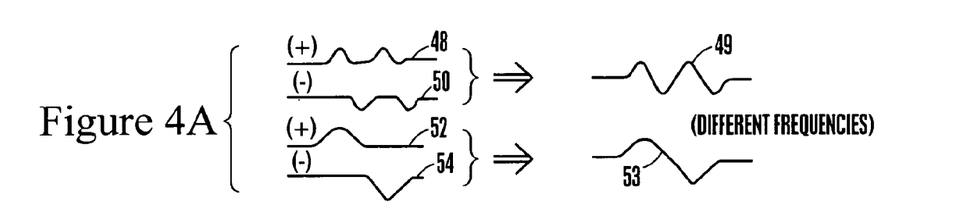
FIG. 4 are graphs of signals generated by the sensors of FIGS. 2 and 3.
Figure 4B:
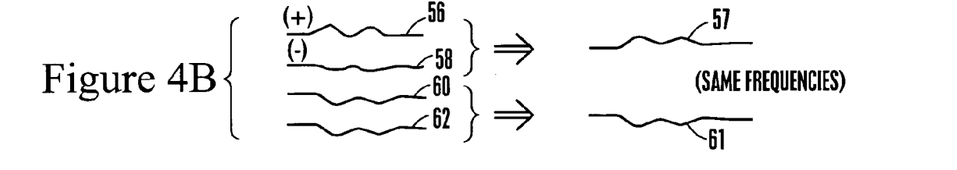

FIG. 4 illustrates the signals that are output by the sensors shown in FIGS. 2 and 3. For simplicity, reference to the detectors 36, 38 shown in FIG. 3 will be made. The top two signals 48, 50 in signal set (a) are output by separate elements of the first detector 36 in the presence of motion of a human through the sub-volumes monitored by the detectors, while the signals 52, 54 in signal set (a) are output by separate elements of the second detector 38 in the presence of a moving human. As shown, the frequency of the element-summed detector output signal 49 is different than (and in the example shown is higher than) the frequency of the element-summed detector output signal 53. When the center-to-center spacings bear a 2:1 ratio, the frequencies of the respective detector output signals likewise bear a 2:1 ratio. Moreover, the first peak of the first detector high frequency signal 49 is substantially simultaneous in time with the maximum positive slope of the second detector low frequency signal 52, in the presence of a moving object. A moving object can be identified by identifying these characteristics (and similar subsequent characteristics of different peak/slope polarity) as being present.

In contrast, signal set (b) represents the detector outputs in response to varying-intensity non-focused white light from a stationary source. These signals 56, 58, 60, 62 arise because the responses of the "equal" and opposite elements only roughly cancel each other. As can be appreciated in reference to FIG. 4, under these circumstances the frequencies of the element-summed signal 57 and 61 that are respectively output by the detectors 36, 38 are equal and, hence easily discriminated from the dual-frequency signals in set (a), thereby reducing the probability of false alarms arising from such varying-intensity non-focused white light.

Moreover, from the pattern of signals generated by the two detectors 36, 38, the direction of motion of the human object 12 can be determined from the polarity pattern of the signal waveform peaks. For example, as alluded to above and referring to the functional diagram of FIG. 3, a moving object 12 entering the larger (+) monitored sub-volume from its left side causes simultaneously a (+) signal slope from the corresponding detector element, and a (+) signal peak from the element corresponding to the left-hand (+) smaller overlapping sub-volume. By continuing in the same direction within the larger (+) monitored sub-volume, the target then causes a (+) signal peak from the corresponding detector element. Still continuing, within the same larger (+) monitored sub-volume, the target causes simultaneously a (−) signal slope from the corresponding detector element, and a (−) signal peak from the element corresponding to the right-hand (−) smaller overlapping sub-volume. In the foregoing case, the simultaneous signal slopes and peaks of matching polarity indicate one direction of motion, whereas slopes and peaks of non-matching polarity indicate the opposite direction of motion. Using the above-disclosed signal sequence principles, the direction of object motion can be ascertained.

Figure 5:
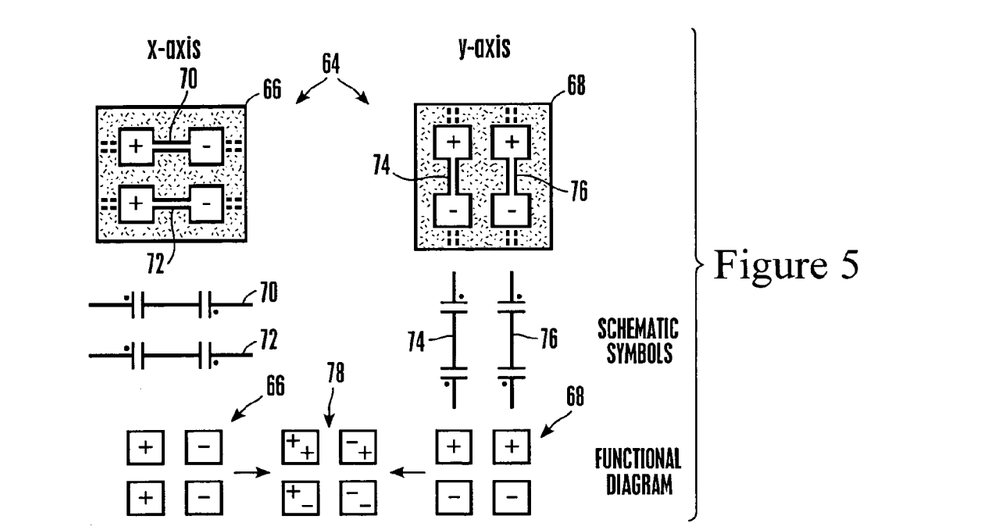
FIG. 5 is a schematic diagram of a third sensor embodiment with detectors in separate housings wired in orthogonal dimensions, showing a plan view of the detectors, along with symbol and functional diagrams of the sensor.

Now referring to FIG. 5, another embodiment of the present improved PIR motion sensor can be seen. As shown, IR detection means for a PIR sensor 64 includes a first detector 66 and a second detector 68. The detectors 66, 68 may be mounted in separate housings. As shown in both the top plan detector view and the schematic symbol diagram, the first detector 66 has two pair of dual-polarity elements 70, 72 that are wired along the x-axis, while the second detector 68 has two pair of dual-polarity elements 74, 76 that are wired along the y-axis. Each pair of dual-polarity elements 70-74 establishes a row of elements. With this configuration, the first detector 66 outputs a signal that is representative of motion in a first dimension (such as, e.g., the y-dimension in a Cartesian system or the radial dimension in a polar system) and the second detector 68 outputs a signal representative of motion in a second dimension (e.g., the x-dimension in a Cartesian system or the angular dimension in a polar system) that is orthogonal to the first dimension.

According to the invention shown in FIG. 5, the sub-volumes of space monitored by the detectors 66, 68 are optically superposed by appropriately configuring the optics system 14 (FIG. 1). With this arrangement, the sensor 64 shown in FIG. 5 establishes a two-dimensional array of pyroelectric detector-monitored sub-volumes that is formed by optical superposition of monitored space sub-volumes resulting from mounting two detectors 66, 68 with orthogonal element wirings behind similar optical components. In other words, the optics system 14 causes both detectors' monitored sub-volumes to occupy the same space, as shown in the functional diagram by the virtual composite detector 78. A moving object can be discriminated from varying intensity white light because movement causes a succession of signals to be generated across the coordinate system, whereas varying white light does not. Stated differently, a location in two-dimensional space is defined by the simultaneous signals from the detectors 66, 68, and when the signals, over time, indicate a change in coordinates, motion of the object is implied. The processing system simply correlates such changes in coordinates to movement to, e.g., activate the alarm when motion is so detected.

As can be appreciated looking at the virtual composite detector 78 in the functional diagram of FIG. 5, by examining the polarities of signals that are simultaneously received from the detectors 66, 68, the position of the object 12 can be determined, in this case, as a confirmation to the coordinate location provided by simultaneous signals from particular coordinates. Specifically, two plus polarity signals indicate that the object is in the upper left quadrant of the overlapping sub-volumes, whereas two minus polarity signals indicate that the object is in the lower right quadrant of the overlapping sub-volumes. On the other hand, a minus polarity signal from the first detector 66, when arriving with a plus polarity signal from the second detector 68, indicates that the object is in the upper right quadrant, and so on. It will readily be appreciated that the principles advanced herein can be applied to arrays greater than 2×2.

Figure 6:
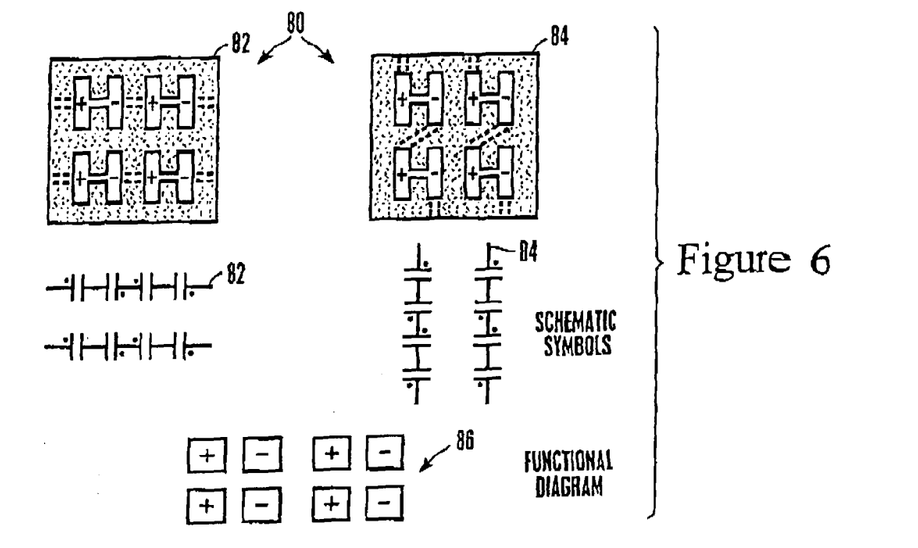
FIG. 6 is a schematic diagram of another implementation of the third sensor embodiment with detectors in separate housings wired in orthogonal dimensions, showing a plan view of the detectors, along with symbol and functional diagrams of the sensor.

For instance, FIG. 6 shows IR detection means for a PIR sensor 80 that includes first and second eight-element detectors 82, 84 that, except for the number of elements, is substantially identical to the sensor 64 shown in FIG. 5. As was the case for the sensor 64, for the sensor 80 shown in FIG. 6 the sub-volumes of the detectors 82, 84 are optically superposed so that the respective monitored sub-volumes occupy the same space to render the virtual composite detector 86 shown in the functional diagram.

Both sensors 64, 80 shown in FIGS. 5 and 6 provide two simultaneous signals ("x" and "y" in Cartesian coordinates) as a moving object 12 moves through the monitored sub-volumes. The object 12 will activate one coordinate in each detector at a time, so that by taking the "x" and "y" signals together, the location of the object 12 can be determined. It will readily be appreciated that the sensor 80 shown in FIG. 6 has higher resolution than the sensor 64 shown in FIG. 5. Still further, if the polarity of the signals is taken into account, additional positional resolution can be obtained, in accordance with principles discussed above.

Both sensors 64, 80 shown in FIGS. 5 and 6 can use an optics system 14 that optically scales human-shape images such that when the object 12 is a human, signals from two or more (x,y) locations in the array will be generated at once, whereas smaller objects such as animals, would induce simultaneous signals from fewer (x,y) locations. In this way, the number of array locations from which signals are simultaneously received can be correlated to an object size, to discriminate, e.g., pets from humans and cause an alarm to be activated only in the presence of the latter, or to open a door only in the presence of the latter, etc.

Figure 7:
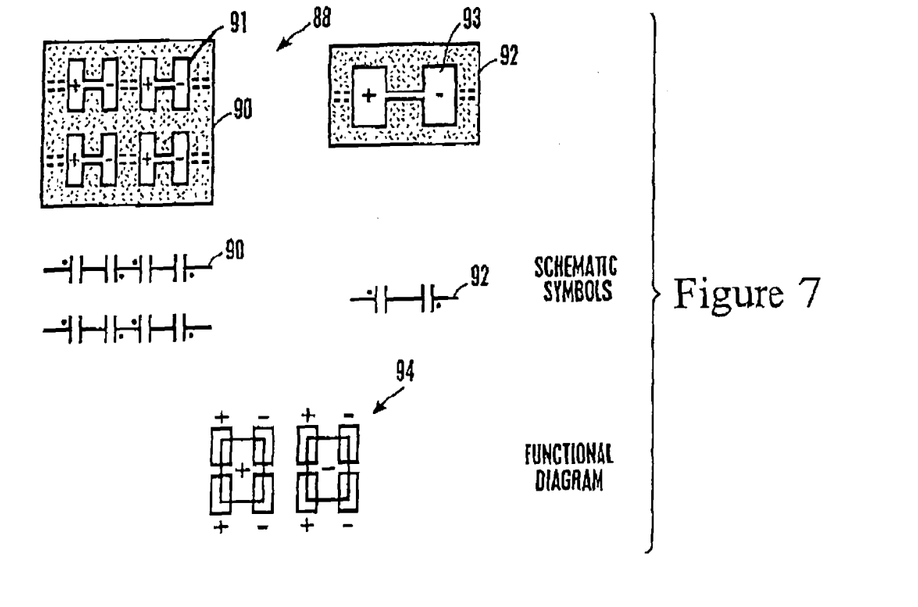
FIG. 7 is a schematic diagram of a fourth sensor embodiment with differently-sized detectors in separate housings wired in orthogonal dimensions, showing a plan view of the detectors, along with symbol and functional diagrams of the sensor.

FIG. 7 shows that the dual frequency concept of the sensors shown in FIGS. 2 and 3 can be combined with the two-dimensional array concept of the sensors shown in FIGS. 5 and 6 both to discriminate moving objects from non-moving objects on the basis of the number of frequencies received, and to determine direction of motion, and to discriminate among moving objects on the basis of size (number of array points simultaneously activated). Specifically, IR detection means for a sensor 88 can include a first detector 90 having elements 91 of one size and a second detector 92 having elements 93 of a different (in this case, larger) size, such that the frequency of the signals generated by the first detector 90 is different from the frequency of the signals generated by the second detector 92 for moving objects. Essentially, as shown by the virtual composite detector 94 in the functional diagram, the sensor 88 establishes a 2×2 array of monitored sub-volumes that is created by optical superposition of the sub-volumes monitored by the detectors 90, 92. The larger detector elements 93 establish an "x" coordinate by polarity, i.e., as shown a signal from the negative polarity element indicates a rightward "x" coordinate while a signal from the positive polarity element 93 indicates a leftward "x" coordinate. A motion-caused signal from each element of the array is identifiable as the simultaneous occurrence of wave peaks from an x-axis element along with twice as many wave peaks (i.e. occurring at twice the frequency) from a y-axis element.

Figure 8:
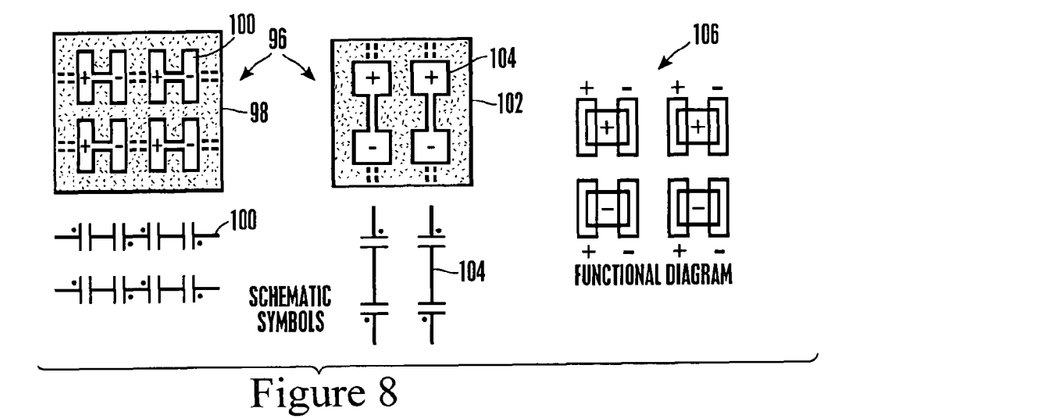
FIG. 8 is a schematic diagram of another implementation of the fourth sensor embodiment with differently-sized detectors in separate housings wired in orthogonal dimensions, showing a plan view of the detectors along with symbol and functional diagrams of the sensor.

FIG. 8 shows yet another IR detection means for a sensor 96 that includes a first detector 98 having two rows of two dual-polarity element pairs 100 wired along the x-axis to produce signals representing "y" coordinates and a second detector 102 having two rows of single dual-polarity element pairs 104 wired along the y-axis to produce signals representing "x" coordinates. The element pairs 100 of the first detector 98 are smaller than the element pairs 104 of the second detector 102, such that the frequency of the signals generated by the first detector 98 is different from the frequency of the signals generated by the second detector 102 for moving objects. The monitored sub-volumes are optically superposed to establish the virtual composite detector 106 shown in the functional diagram. This two-dimensional detector array provides greater position resolution than the sensor 88 shown in FIG. 7.

Figure 9:
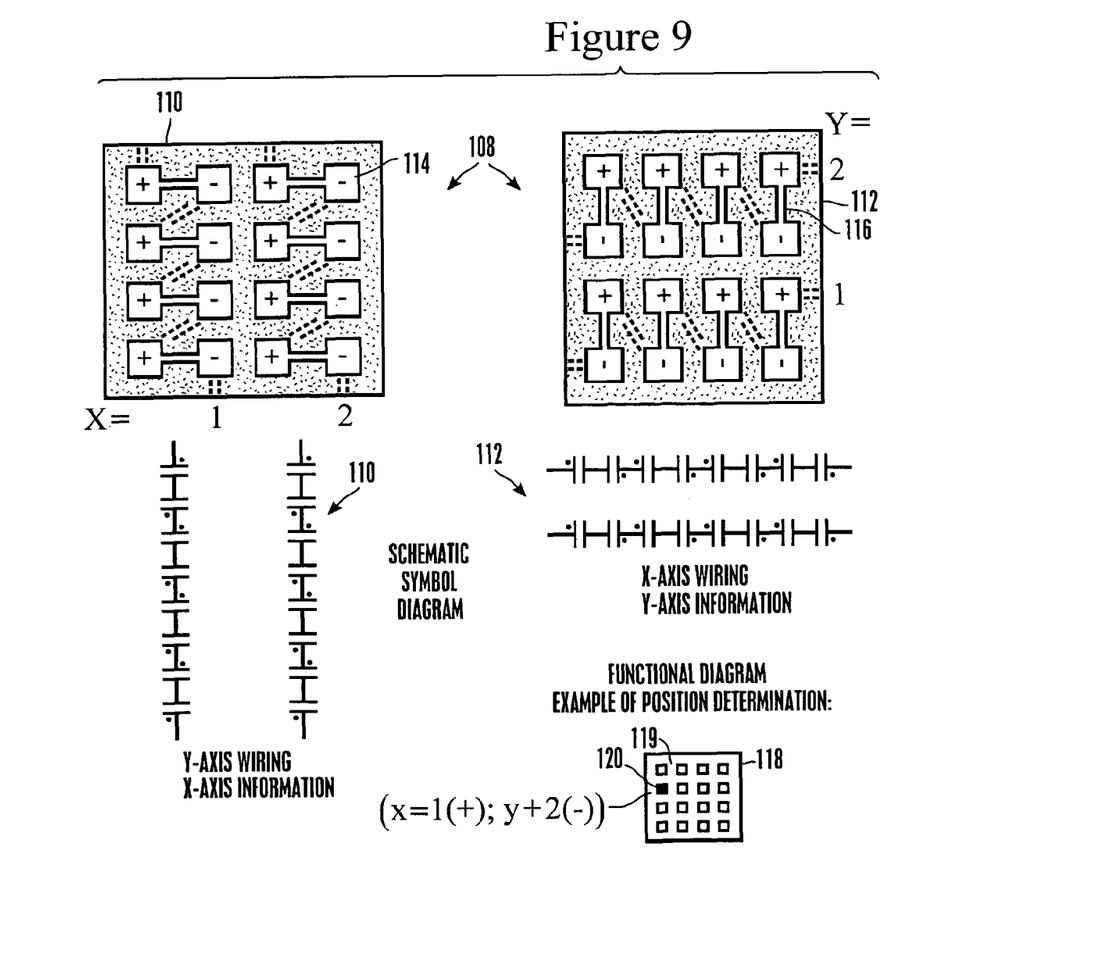
FIG. 9 is a schematic diagram of still another implementation of the fourth sensor embodiment with differently-sized detectors in separate housings wired in orthogonal dimensions, showing a plan view of the detectors, along with symbol and functional diagrams of the sensor.

FIG. 9 illustrates IR detection means for a sensor 108 that is in all essential respects identical to the sensor 64 shown in FIG. 5, in that it has first and second detectors 110, 112 having respective elements 114, 116 of equal size and orthogonal wiring, except that the sensor 108 shown in FIG. 9 has eight dual-polarity element pairs per detector. The elements 114 of the first detector 110 are arranged in two vertical rows that are wired in the y-dimension by connecting the minus polarity element of a pair to the positive polarity element of the pair immediately below. On the other hand, the elements 116 of the second detector 112 are arranged in two horizontal rows that are wired in the x-dimension by connecting the minus polarity element of a pair to the positive polarity element of the pair immediately to the left. As indicated by the schematic symbol diagram, the y-dimension wired element pairs 114 of the first detector 110 provide x-dimension position information, while the x-dimension wired element pairs 116 of the second detector 112 provide y-dimension position information. To find position information, as illustrated by the virtual composite detector 118 in the functional diagram, the position of the object is indicated as in quadrant 119 in two-dimensional space (x=1, y=2) from which signals are simultaneously received, and as the point 120 by signal polarities (x=plus, y=minus). Also, moving objects are discriminated from non-moving interfering light by observing the sequential activation of points in the virtual composite detector 118.

Figure 10:
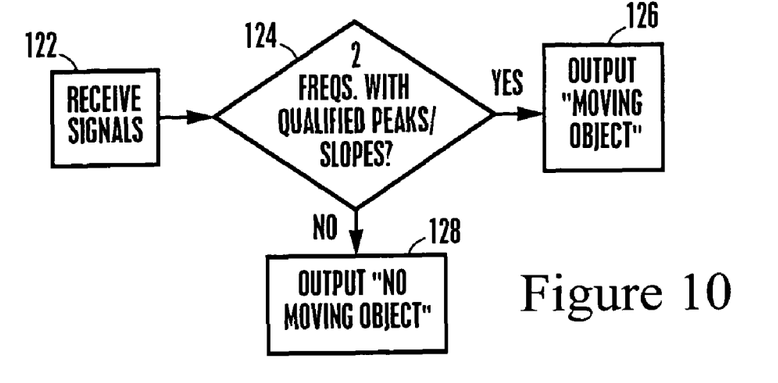
FIG. 10 is a flow chart of the logic for using plural frequencies to obtain an output representative of a moving object.

Now referring to FIG. 10, an exemplary logic flow chart for using different frequencies from the sensors shown in FIGS. 2, 3, 7, and 8 can be seen. Commencing at block 122, signals from the two detectors are received in, e.g., a clock cycle. Moving to decision diamond 124 it is determined whether the signals are of two different frequencies and, if desired, whether the first peak of the signal from the first detector temporally coincides with the maximum slope of the signal from the second detector. Peaks and slopes can also be compared if desired for matching within user-defined criteria. If two frequencies are detected and, if desired, the peaks/slopes coincide in time and/or the peaks and slopes match defined criteria, "moving object" is output at state 126. Otherwise, "no moving object" is output at state 128.

It is to be understood that by "frequency" is meant not only the frequency of a sinusoidal-shaped signal that is typically generated when an object moves in a single direction at a constant speed across the monitored sub-volumes, but also the frequency of non-sinusoidal shaped or semi-sinusoidal shaped signals that essentially appear as pulses when, e.g., a person randomly moves in various directions and at various speeds through the monitored sub-volumes. In the latter case, more pulses per unit time, whether sinusoidal-shaped or not, are generated by the detector having the closer center-to-center element spacing than the number of pulses per unit time generated by the detector having the greater center-to-center element spacing. "Frequency" thus encompasses pulses or peaks per unit time.

Figure 11:
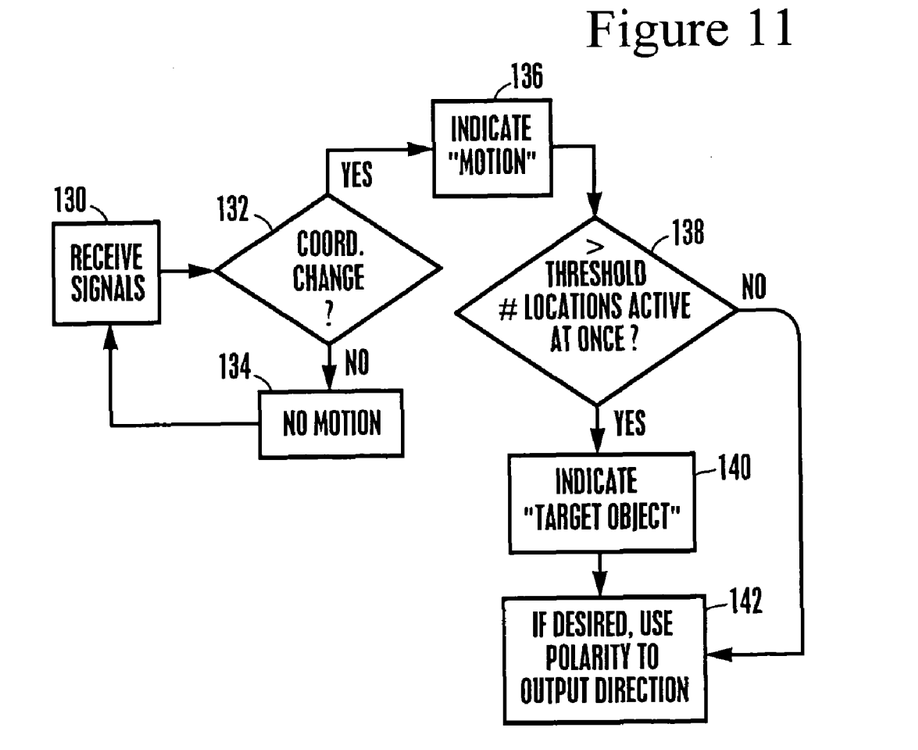
FIG. 11 is a flow chart of the logic for using the two dimensional sensors of FIGS. 5-9 to obtain an output representative of a moving object.

FIG. 11 shows the logic by which signals from the two-dimensional sensors shown in FIGS. 5-9 may be used to determine whether an object is moving. The signals from the two detectors of a sensor are received at block 130, and by determining, at decision diamond 132, that the coordinates of an object have changed within, e.g., a predetermined period of time, movement is indicated at block 136. Otherwise, no movement is indicated at block 134 and the logic loops back to block 130.

In addition to determining motion, the logic, for certain of the sensors disclosed herein, may proceed to decision diamond 138 to determine whether at least a threshold number of coordinates are active at once. In other words, it is determined whether a threshold number of signals are simultaneously received from plural elements of the detectors, indicating a moving object that equals or exceeds a predetermined size. Generally, larger moving objects are human in response to whom it is typically desired to activate the alarm, open a door, or take some other action, whereas smaller moving objects typically are pets for whom no action generally is to be taken. Accordingly, for a larger object as determined at decision diamond 138, the logic moves to block 140 to indicate "target object" and, e.g., activate the alarm 22. On the other hand, if the object is not of sufficiently large size, no action will be taken.

Block 142 further indicates that the polarity of the signals can be used as discussed above to determine the direction of motion, regardless of object size if desired. In some cases it might be desirable to take action (such as activating the alarm 22 or opening a door) not just in the presence of a large moving object, but in the presence of a large moving object that is moving in a predetermined direction. Under these conditions, a signal might generated indicating some predetermined action to be taken only after the determination at block 142 indicates that a large moving object is indeed moving in the predetermined direction.

It may now be appreciated that the sensors discussed above discriminate interfering white light from moving objects, as well as, in certain embodiments, discriminate moving objects from each other essentially based on object size. Also; one or more of the sensors discussed above can provide rough determinations of direction of object motion.

Figure 12:
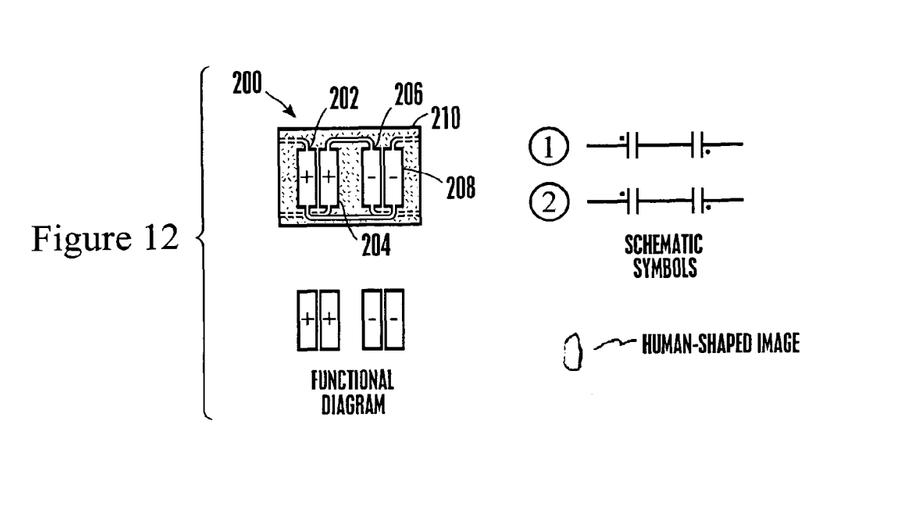
FIG. 12 is a schematic diagram of still another sensor embodiment showing a plan view of the detectors along with symbol and functional diagrams of the sensor, and showing a human figure schematically.
Figure 13A:
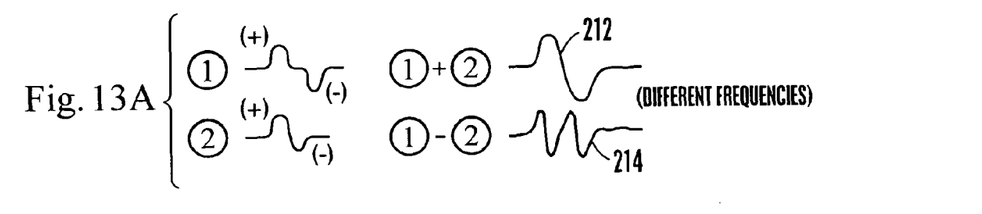
FIG. 13 is a graph of signals generated by the sensor of FIG. 12.
Figure 13B:
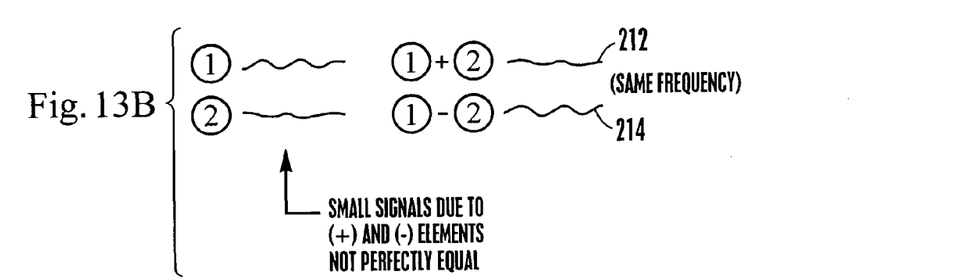

Now referring to FIGS. 12 and 13, a sensor is shown, generally designated 200, that can be used as the PIR detection system 16 shown in FIG. 1. As shown, the sensor 200 includes at least two and in some implementations only two detector elements, each of which may have, in some implementations, two and only two parts, namely, a positive and negative part. If desired, all four parts may be of equal size and shape to each other. Each element generates a respective signal.

More specifically, in the non-limiting embodiment shown the above-mentioned detector element parts are arranged on a substrate in the following order, from left to right: a positive part 202 of a first element, a positive part 204 of the second element, a negative part 206 of the second element, and a negative part 208 of the first element, with the parts of an element being electrically connected to each other and disposed on a substrate 210. That is, the right-most positive part 204 and the left-most negative part 206 establish a first detector element, while the left-most positive part 202 and the right-most negative part 208 establish a second detector element. In any case, in the illustrative implementation shown the positive parts 202, 204 are physically next to each other without any negative parts intervening and the negative parts 206, 208 are physically next to each other without any positive parts intervening. As was the case with the prior sensors, the first detector element shown in FIG. 12 monitors a first volume of space that, if desired, at least partially may be optically interposed or superposed with a second volume of space monitored by the second detector element. The substrate 210 with both elements may be held in a single detector housing. In the non-limiting embodiment shown the two volumes of space are interleaved, or "interposed", although other implementations can use the superposition principles set forth above.

FIG. 12 also shows, in addition to the element view, a schematic symbol and a functional diagram of the sensor 200, as well as a human-shaped image. The sensor 200 thus has two sets of elements, and when placed behind compound optics, produces two separate signals in response to images passing over the detector due to moving objects passing through the fields-at-view of the compound optics.

This can better be appreciated in reference to FIG. 13, which shows, in part (a), the signals produced by the two detector elements (labelled "1" and "2" in FIG. 13) in the presence of a moving object and, in part (b), the signals that are produced in the presence of non-moving stimuli such as white light. It is to be understood that a system that might include one or both of the signal processing circuit 18 and processing system 20 shown in FIG. 1 can be used to execute the following processing.

As can be appreciated in part (a) of FIG. 13, the signals from the two detector elements are added together to produce a sum signal 212. Also, the difference between the signals is rendered to produce a difference signal 214. To produce the difference signal, the individual detector element signals may be added together with the polarity of one of the signals reversed with respect to the signal baseline, thus effectively subtracting one signal from the other.

In the case of a moving object stimulus (part (a) of FIG. 13), it can readily be appreciated that the "sum" signal 212 is of a different frequency than the "difference" signal 214. In contrast, in part (b) (when the detector elements are stimulated by non-moving stimuli), the frequency of the "sum" signal 212 is the same as the frequency of the "difference" signal 214, albeit the "sum" and "difference" signals have different amplitudes. The processing system thus can correlate the frequency information to whether a moving object has been detected, and if so, output a detection signal and/or alarm so indicating.

Accordingly, the signal processing system associated with the sensor 200 can better discriminate between true motion and other signals. In the case of white light, and in the cases of several other detector-interfering stimuli, this improved detector offers dramatic reduction of false alarm probability.

Figure 14:
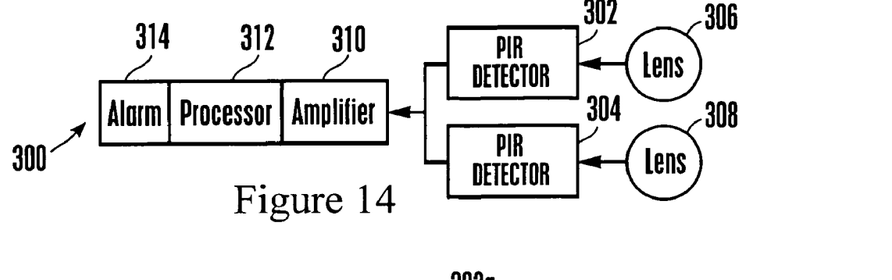
FIG. 14 is a block diagram of an alternate motion sensor system.
Figure 15:
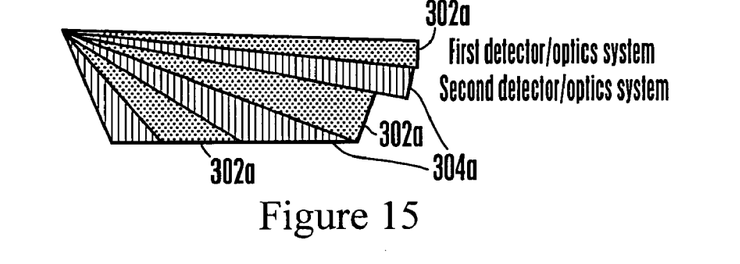
FIG. 15 is a schematic diagram showing a side view of monitored spatial volumes.

FIG. 14 shows an alternate system 300 having two or more PIR detectors 302, 304 (only two shown for clarity) in a single housing and receiving light from one or more respective optical elements 306, 308, with a detector and associated optical element establishing a detection member. The detectors send signals to processing circuitry 310 that may include amplification circuitry, and a processor 312 processes the signals to determine whether to activate an audible or visual alarm 314. The signal processing may be accomplished in accordance with disclosure above or in accordance with the above-referenced '250 patent, and the optical portion of the system 300 may be substantially identical to that shown in the '250 patent, with the following exceptions. The optical elements 306, 308 may be Fresnel lenses but they are configured such that no vertical dead space exists between any two adjacent monitored volumes, as shown in FIG. 15, in which volumes 302a are monitored by the detection member that includes the detector 302 and volumes 304a are monitored by the detection member that includes the detector 304. Also, for the embodiments shown in FIGS. 16-18 motion is interpreted by the processing circuitry based on the simultaneous reception of different frequencies from the detectors 302, 304 in accordance with disclosure above. Fresnel lenses yielding the dead zones of the '250 patent less optimally may be used in connection with the present frequency-based motion discrimination principles.

Figure 16:
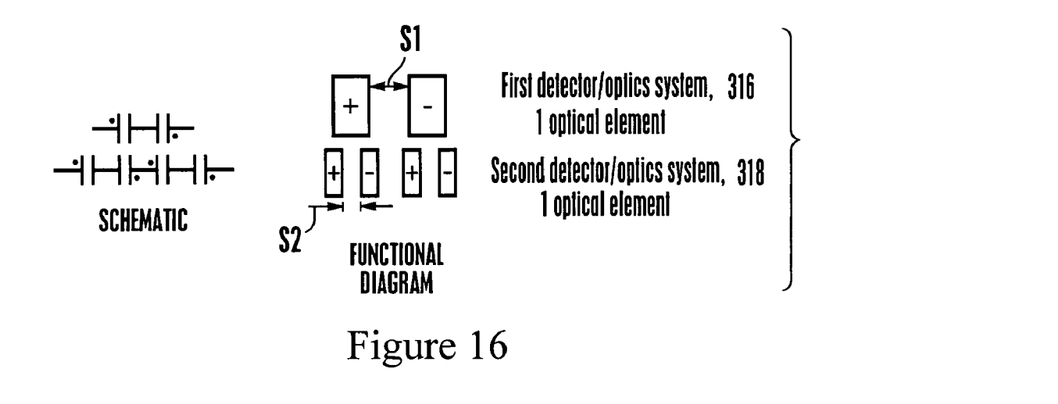
FIGS. 16-21 are schematic diagrams of various embodiments of the system shown in FIG. 14, each showing a respective functional diagram (each arising from a detector element plan view as in previous figures) of the various detectors along with a respective symbol diagram.

With the structure of the alternate motion sensor 300 in mind, attention is now turned to FIGS. 16-21, showing various embodiments of the detection members. In FIG. 16, a first detection member 316 includes one optical element with a detector having two elements, one positive and one negative, as shown defining a first spacing S1 between them. A second detection member 318 includes one optical element with a detector having four detector elements alternating positive and negative defining a second spacing S2 between adjacent detector elements as shown. In the embodiment shown in FIG. 16, the size of each detector element of the first detection member 316 may be larger than the size of each detector element of the second detection member 318, and/or the spacing S1 may not be equal to the spacing S2. The focal lengths of the associated optical elements can be equal. A moving object causes the detection members 316, 318 to generate signals of different frequencies from each other, which frequency difference is interpreted as motion by the processing circuitry, whereas a stationary stimulus causes the detection members to output the same frequency. Size discrimination is also possible using information from the volumes 302a, 304a, e.g., a small moving object might substantially occupy only one volume at a time, stimulating one detector much more than the other detector and thus indicating its smallness, whereas a large moving object would fill more than one volume at a time and hence stimulate both detection members simultaneously.

Figure 17:
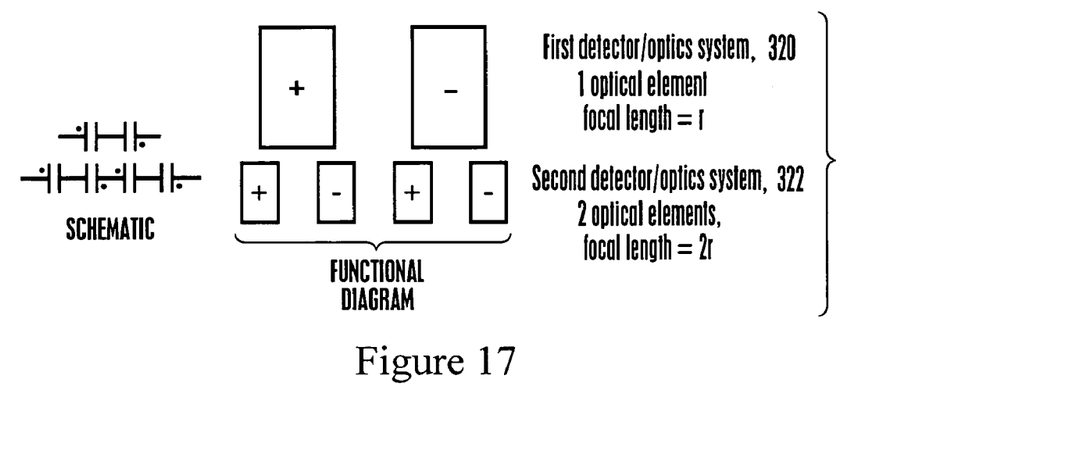

FIG. 17 shows a first detection member 320 that includes one optical element with a detector having two detector elements, one positive and one negative, and a second detection member 322 that includes two optical elements with a detector having two detector elements that, because of the two optical elements, appear in the functional diagram as four monitored sub-volumes as shown, alternating positive and negative. In the embodiment shown in FIG. 17, the size of each detector element of the first detection member 320 may be the same as the size of each detector element of the second detection member 322, and the spacing between detector elements of the first detection member 320 may be equal to that between detector elements of the second detection member 322, but the focal lengths of the associated optical elements are unequal, e.g., by a factor of two, causing the functional diagram to depict the monitored sub-volumes of the first detection member 320 as being larger than those of the second detection member 322. As was the case with the detection members of FIG. 16, in FIG. 17 motion is indicated by different frequencies from the detection members, and size discrimination may be implemented.

Figure 18:
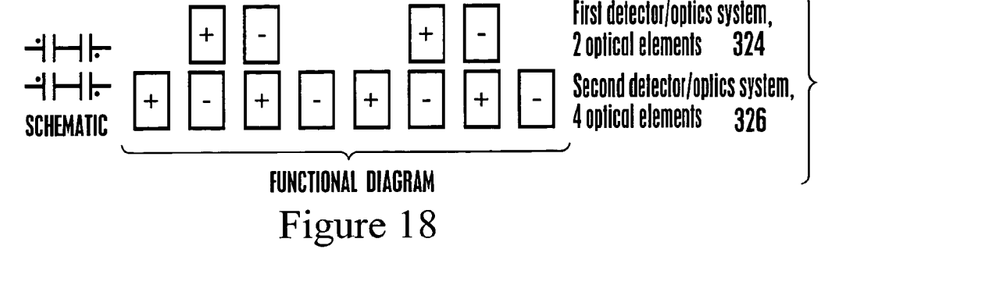

FIG. 18 shows a first detection member 324 that includes two optical elements and a detector having two detector elements, appearing in the functional diagram as four monitored sub-volumes, as depicted in the top row alternating positive and negative. Also, a second detection member 326, shown in the bottom row, includes four optical elements that cause one positive detector element and one negative detector element to appear in the functional diagram as eight monitored sub-volumes, alternating positive and negative. In the embodiment shown in FIG. 18, the size of each detector element of the first detection member 324 may be the same as the size of each detector element of the second detection member 326, but unequal spacing is used for motion discrimination. Specifically, either the spacing between the two detector elements of the first detection member 324 is different from the spacing between adjacent detector elements of the second detection member 326, or the spacing between lens elements of the Fresnel lens associated with the first detection member 324 is different from the spacing between lens elements of the Fresnel lens associated with the second detection member 326, meaning that in practical applications the optical elements have unequal numbers of lens elements. A moving object produces a first number of signal peaks per unit time from the first detection member 324 and a second number of signal peaks per unit time from the second detection member 326, with the first and second numbers being different and on that basis indicating a moving object—essentially, once again producing different frequencies for a moving object. Size discrimination may be implemented.

Figure 19:
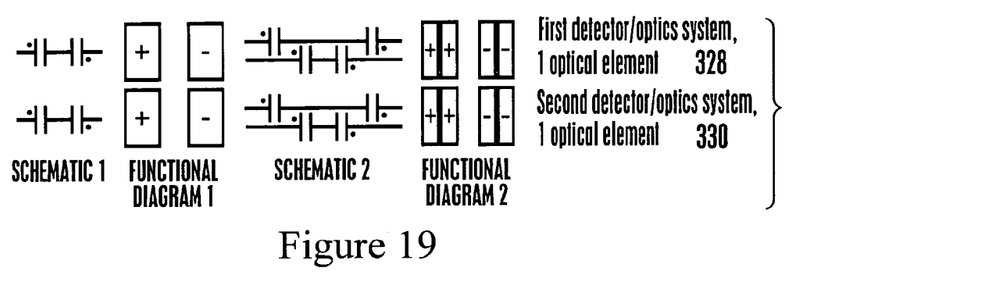
Figure 20:
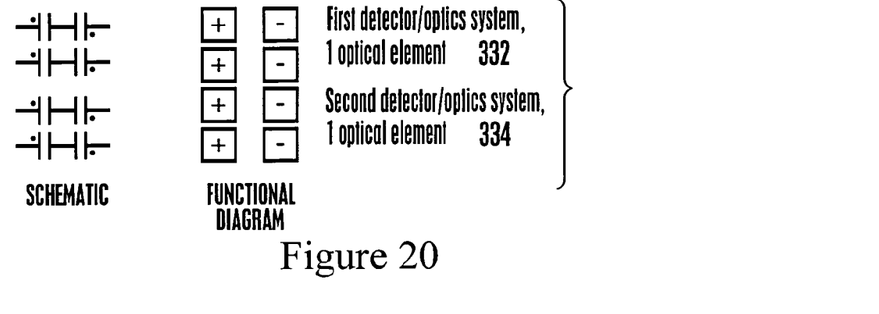
Figure 21:
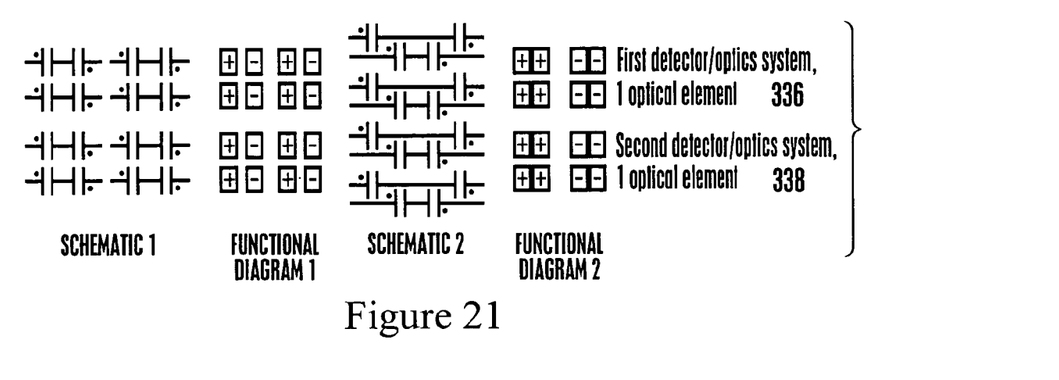

FIGS. 19-21 show various sensor embodiments, including some that less optimally may not produce different frequencies to indicate motion yet that do support size discrimination. In FIG. 19, a first detection member 328 includes one optical element with detector having positive and negative detector elements and a second detection member 330 with one optical element with a detector having positive and negative detector elements, with all detector elements being of equal size and spacing and with equal lens systems that do not necessarily produce the dead zones of the '250 patent. Size discrimination can be undertaken in accordance with above principles without vertical dead zones. When the detector elements are wired as shown in "schematic 1" of FIG. 19 and arranged so as to create an array of monitored sub-volumes as depicted in "functional diagram 1", no dual frequency operation results for moving objects. On the other hand, the detector elements can be wired and arranged as indicated in FIG. 13 discussed above to produce "schematic 2" and "functional diagram 2", in which motion detection is indicated in the presence of different frequencies from the two detection members.

FIG. 20 shows a first detection member 332 that includes one optical element with a detector having two positive and two negative detector elements and a second detection member 334 with one optical element with a detector having two positive and two negative detector elements, with all detector elements being of equal size and spacing, and with equal lens systems that do not necessarily produce the dead zones of the '250 patent. Size discrimination can be undertaken in accordance with above principles without vertical dead zones.

FIG. 21 shows a first detection member 336 that includes one optical element with a detector having four positive and four negative detector elements and a second detection member 338 with one optical element with a detector having four positive and four negative detector elements, with all detector elements being of equal size and spacing and with equal lens systems that do not necessarily produce the dead zones of the '250 patent. Size discrimination can be undertaken in accordance with above principles without vertical dead zones. The eight-element detectors yield 4×4 resolution. When the detector elements are wired as shown in "schematic 1" of FIG. 21 and arranged so as to create an array of monitored sub-volumes as depicted in "functional diagram 1", no dual frequency operation results for moving objects. On the other hand, the detector elements can be wired and arranged as indicated in FIG. 13 discussed above to produce "schematic 2" and "functional diagram 2" in FIG. 21, in which motion detection is indicated in the presence of different frequencies from the two detection members.

It is to be understood that for the embodiments shown in FIGS. 14-21, the detection members are depicted in their basic unit form, and that they can be multiplied by placing multiple first detection members side by side vertically and/or horizontally and/or otherwise, to increase the field of view. Detector element spacing shown in the functional diagrams are for illustration only, it being understood that spacing between parts does not necessarily imply the presence of dead zones.

While the particular IMPROVED PIR MOTION SENSOR as herein shown and described in detail is fully capable of attaining the above-described objects of the invention, it is to be understood that it is the presently preferred embodiment of the present invention and is thus representative of the subject matter which is broadly contemplated by the present invention, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A PIR motion sensor comprising:
   at least first and second infrared detection members, each detection member including at least one optical element and at least one detector with at least positive and negative detector elements, wherein:
   the optical elements cooperate to establish four or more monitored spatial volumes substantially without any unmonitored vertical dead space between any two adjacent volumes established by the optical elements, the first detection member monitoring first volumes and the second detection member monitoring second volumes, the first and second volumes alternating in sequence; and further wherein
   a moving object causes the detector of the first detection member to output a signal having a frequency that is different from an output of the detector of the second detection member, and a non-moving stimulus causes both detectors to output the same non-zero frequency, wherein a spacing between adjacent detector elements of the first detection member is different from a spacing between adjacent detector elements of the second detection member.

2. The sensor of claim 1, wherein at least one detector element of the first detection member has a different size than at least one detector element of the second detection member.

3. The sensor of claim 1, wherein the focal length of the optical element of the first detection member is different from the focal length of the optical element of the second detection member.

4. A PIR motion sensor comprising:
   at least first and second infrared detection members, each detection member including at least one optical element and at least one detector with at least positive and negative detector elements, wherein:
   the optical elements cooperate to establish four or more monitored spatial volumes substantially without any unmonitored vertical dead space between any two adjacent volumes established by the optical elements, the first detection member monitoring first volumes and the second detection member monitoring second volumes, the first and second volumes alternating in sequence; and further wherein
   a moving object causes the detector of the first detection member to output a signal having a frequency that is different from an output of the detector of the second detection member, and a non-moving stimulus causes both detectors to output the same non-zero frequency, wherein at least one detector element of the first detection member has a different size than at least one detector element of the second detection member and wherein a spacing between adjacent detector elements of the first detection member is different from a spacing between adjacent detector elements of the second detection member.

5. A PIR motion sensor comprising:
   at least first and second infrared detection members, each detection member including at least one optical element and at least one detector with at least positive and negative detector elements, wherein:
   the optical elements cooperate to establish four or more monitored spatial volumes substantially without any unmonitored vertical dead space between any two adjacent volumes established by the optical elements, the first detection member monitoring first volumes and the second detection member monitoring second volumes, the first and second volumes alternating in sequence: and further wherein
   a moving object causes the detector of the first detection member to output a signal having a frequency that is different from an output of the detector of the second detection member, and a non-moving stimulus causes both detectors to output the same non-zero frequency, wherein a number of lens elements of the optical element of the first detection member is different from a number of lens elements of the optical element of the second detection member.

6. A motion sensor having at least first and second detection members monitoring alternating volumes of space with substantially no unmonitored vertical space between any two monitored volumes, each detection member including at least one optical element and at least one detector with at least positive and negative detector elements, wherein a moving object causes the detection members to output different frequencies from each other and a non-moving stimulus causes both detection members to output the same non-zero frequency, wherein a number of lens elements of the optical element of the first detection member is different from a number of lens elements of the optical element of the second detection member.

7. The sensor of claim 6, wherein at least one detector element of the first detection member has a different size than at least one detector element of the second detection member.

8. The sensor of claim 6, wherein the focal length of the optical element of the first detection member is different from the focal length of the optical element of the second detection member.

9. A motion sensor having at least first and second detection members monitoring alternating volumes of space with substantially no unmonitored vertical space between any two monitored volumes, each detection member including at least one optical element and at least one detector with at least positive and negative detector elements, wherein a moving object causes the detection members to output different frequencies from each other and a non-moving stimulus causes both detection members to output the same non-zero frequency, wherein a spacing between adjacent detector elements of the first detection member is different from a spacing between adjacent detector elements of the second detection member.

10. A motion sensor having at least first and second detection members monitoring alternating volumes of space with substantially no unmonitored vertical space between any two monitored volumes, each detection member including at least one optical element and at least one detector with at least positive and negative detector elements, wherein a moving object causes the detection members to output different frequencies from each other and a non-moving stimulus causes both detection members to output the same non-zero frequency, wherein at least one detector element of the first detection member has a different size than at least one detector element of the second detection member, wherein a spacing between adjacent detector elements of the first detection member is different from a spacing between adjacent detector elements of the second detection member.

11. A motion sensor having at least first and second detection members monitoring alternating volumes of space, each detection member including at least one optical element and at least one detector with at least positive and negative detector elements, wherein a moving object causes the detection members to output different frequencies from each other and a non-moving stimulus causes both detection members to output the same non-zero frequency, wherein a spacing between adjacent detector elements of the first detection member is different from a spacing between adjacent detector elements of the second detection member.

12. The sensor of claim 11, wherein substantially no unmonitored vertical space exists between any two monitored volumes.

13. The sensor of claim 12, wherein at least one detector element of the first detection member has a different size than at least one detector element of the second detection member.

14. The sensor of claim 12, wherein the focal length of the optical element of the first detection member is different from the focal length of the optical element of the second detection member.

15. A motion sensor having at least first and second detection members monitoring alternating volumes of space, each detection member including at least one optical element and at least one detector with at least positive and negative detector elements, wherein a moving object causes the detection members to output different frequencies from each other and a non-moving stimulus causes both detection members to output the same non-zero frequency, wherein substantially no unmonitored vertical space exists between any two monitored volumes, wherein at least one detector element of the first detection member has a different size than at least one detector element of the second detection member, wherein a spacing between adjacent detector elements of the first detection member is different from a spacing between adjacent detector elements of the second detection member.

16. A motion sensor having at least first and second detection members monitoring alternating volumes of space, each detection member including at least one optical element and at least one detector with at least positive and negative detector elements, wherein a moving object causes the detection members to output different frequencies from each other and a non-moving stimulus causes both detection members to output the same non-zero frequency, wherein substantially no unmonitored vertical space exists between any two monitored volumes, wherein a number of lens elements of the optical element of the first detection member is different from a number of lens elements of the optical element of the second detection member.

* * * * *